(12) United States Patent
Chakravarti et al.

(10) Patent No.: US 6,592,829 B2
(45) Date of Patent: Jul. 15, 2003

(54) CARBON DIOXIDE RECOVERY PLANT

(75) Inventors: Shrikar Chakravarti, East Amherst, NY (US); Amitabh Gupta, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 240 days.

(21) Appl. No.: 09/774,031

(22) Filed: Jan. 31, 2001

(65) Prior Publication Data
US 2001/0026779 A1 Oct. 4, 2001

Related U.S. Application Data

(60) Continuation-in-part of application No. 09/711,962, filed on Nov. 15, 2000, now abandoned, which is a division of application No. 09/329,279, filed on Jun. 10, 1999, now Pat. No. 6,174,506.

(51) Int. Cl.⁷ .......................... B01D 53/60; B01D 53/62
(52) U.S. Cl. ...................... 422/171; 422/170; 422/172; 422/173
(58) Field of Search ................................ 422/168–173, 422/190, 198; 96/202, 203

(56) References Cited

U.S. PATENT DOCUMENTS

| | | | |
|---|---|---|---|
| 2,559,580 A | * 7/1951 | Alexander | 423/228 |
| 4,150,956 A | * 4/1979 | Vaseen | 95/28 |
| 4,364,915 A | 12/1982 | Proctor | 423/437 |
| 4,440,731 A | 4/1984 | Pearce | 423/228 |
| 4,477,419 A | 10/1984 | Pearce et al. | 423/228 |
| 4,624,839 A | 11/1986 | Wolcott et al. | 423/228 |
| 4,766,229 A | * 8/1988 | Kobayashi et al. | 95/230 |
| 6,174,506 B1 | * 1/2001 | Chakravarti et al. | 423/220 |

FOREIGN PATENT DOCUMENTS

| | | |
|---|---|---|
| DE | 1517586 | 7/1969 |
| EP | 417342 | 3/1991 |
| JP | 56161806 | 12/1981 |
| JP | 57201583 | 12/1982 |
| SU | 654274 | 9/1979 |

* cited by examiner

Primary Examiner—Hien Tran
(74) Attorney, Agent, or Firm—Stanley Ktorides

(57) ABSTRACT

A system for recovering absorbate such as carbon dioxide from an oxygen containing mixture wherein carbon dioxide is concentrated in an alkanolamine containing absorption fluid, oxygen is separated from the absorption fluid, the resulting fluid is heated, and carbon dioxide is steam stripped from the absorption fluid and recovered.

9 Claims, 2 Drawing Sheets

CARBON DIOXIDE RECOVERY PLANT

This application is a continuation-in-part of prior U.S. Ser. No. 09/711,962, filed Nov. 15, 2000, now abandoned, which is a divisional of prior U.S. Ser. No. 09/329,279, filed Jun. 10, 1999, now U.S. Pat. No. 6,174,506.

TECHNICAL FIELD

This invention relates generally to the recovery of carbon dioxide and, more particularly, to the recovery of carbon dioxide from a feed mixture which also contains oxygen.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses include drinking water treatment, an environmentally friendly pesticide and an atmosphere additive in greenhouses to improve the growth of vegetables.

Generally carbon dioxide is produced by purifying a waste stream which is a by-product of an organic or inorganic chemical process. The waste stream, which comprises a high concentration of carbon dioxide, is condensed and purified in multiple stages and then distilled to produce the product grade carbon dioxide.

As the demand for carbon dioxide continues to increase, alternate sources of carbon dioxide are being used to supply the crude carbon dioxide feed to the purification system. Such alternate feeds have a much lower concentration of carbon dioxide and thus need to be upgraded, i.e. the concentration of the carbon dioxide must be increased, before product grade carbon dioxide can be effectively produced. These alternate feeds with much lower carbon dioxide concentrations are referred to as lean feeds. An example of such a lean feed is flue gas from, for example, a combustion source such as a boiler, internal combustion engine, gas turbine or lime kiln.

Upgrading of the carbon dioxide concentration in a feed can be carried out in a number of ways. One particularly preferred method is the chemical absorption of carbon dioxide from the crude carbon dioxide feed into an alkanolamine based absorbent. The resulting carbon dioxide loaded absorbent then undergoes separation into carbon dioxide product for recovery and into alkanolamine containing absorbent which is may be recycled for reuse within the recovery system.

Often the crude carbon dioxide feed contains significant levels of oxygen which can cause degradation of the alkanolamines reducing their utility in the recovery system and also causing corrosion problems in the system. Those skilled in the art have addressed this problem in one of two ways. In one method, chemical inhibitors are added to the absorber fluid to protect against degradation by inhibiting the oxidation of the alkanolamines. In another method, the oxygen is removed from the crude carbon dioxide feed prior to the interaction of the crude carbon dioxide feed with the alkanolamine based absorbent. In one example of this method, a combustible fuel is added to the crude carbon dioxide feed for combustion with the oxygen in a catalytic combustion reaction. While both methods are effective they are both characterized by high capital costs and, moreover, are complicated to operate.

Accordingly, it is an object of this invention to provide a system which can more effectively recover carbon dioxide or other absorbate from an oxygen containing feed using an alkanolamine based absorbent to upgrade the feed.

SUMMARY OF THE INVENTION

The above and other objects, which will become apparent to one skilled in the art upon a reading of this disclosure, are attained by the present invention which is:

Apparatus for recovering absorbate from an oxygen-containing feed mixture comprising:

(A) an absorption column, means for passing a feed mixture comprising oxygen and absorbate into the lower portion of the absorption column, and means for passing absorbent comprising at least one alkanolamine into the upper portion of the absorption column;

(B) an oxygen separator and means for passing fluid from the lower portion of the absorption column into the oxygen separator;

(C) a heat exchanger and means for passing fluid from the oxygen separator to the heat exchanger;

(D) a stripping column and means for passing fluid from the heat exchanger to the upper portion of the stripping column; and (E) means for recovering absorbate from the upper portion of the stripping column.

As used herein, the term "absorption column" means a mass transfer device that enables a suitable solvent, i.e. absorbent, to selectively absorb the absorbate from a fluid containing one or more other components.

As used herein, the term "stripping column" means a mass transfer device wherein a component such as absorbate is separated from absorbent, generally through the application of energy.

As used herein, the term "flash tank" means a vessel that allows for phase separation of a dissolved gas from a liquid through pressure reduction such as by the operation of a vacuum pump.

As used herein, the term "inhibitor" means a chemical or mixture of chemicals that inhibits or reduces the rate of a reaction. For example, copper carbonate in combination with one or more of dihydroxyethylglycine, alkali metal permanganate, alkali metal thiocyanate, nickel or bismuth oxides with or without alkali metal carbonate inhibits oxidative degradation of an alkanolamine.

As used herein the term "oxygen scavenging gas" means a gas that has an oxygen concentration less than 2 mole percent, preferably less than 0.5 mole percent, and which can be used to strip dissolved oxygen from a liquid.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

DETAILED DESCRIPTION

Figure 1:
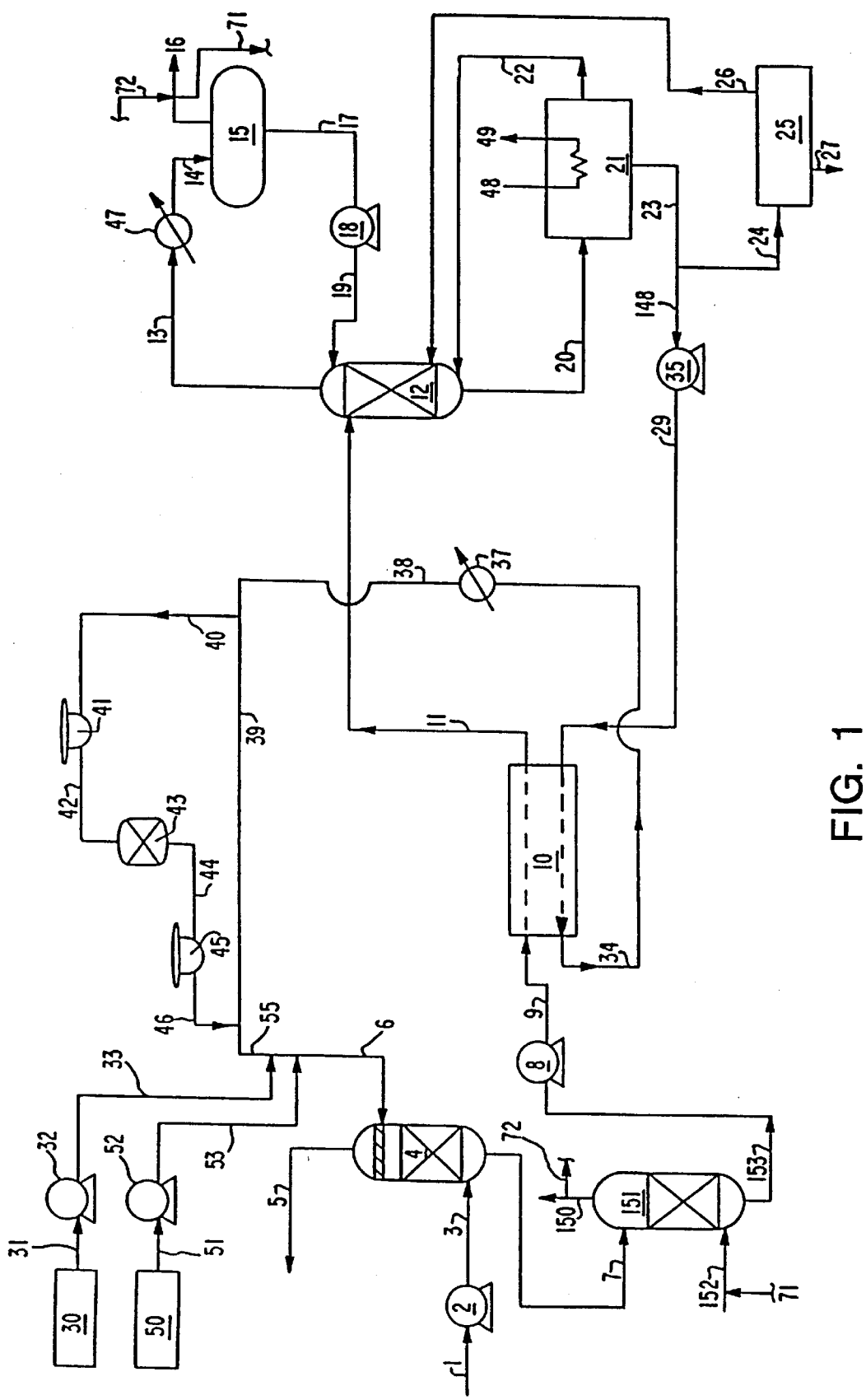
FIG. 1 is a schematic representation of one particularly preferred embodiment of the invention wherein the oxygen separator comprises an oxygen stripping column.

The invention will be described in greater detail with reference to the Drawings. Referring now to FIG. 1, feed gas mixture 1, which typically has been cooled and treated for the reduction of particulates and other impurities such as sulfur oxides (SOx) and nitrogen oxides (NOx), is passed to compressor or blower 2 wherein it is compressed to a pressure generally within the range of from 14.7 to 30 pounds per square inch absolute (psia). Feed gas mixture 1 generally contains from 2 to 50 mole percent carbon dioxide as the absorbate, and typically has a carbon dioxide concentration within the range of from 3 to 25 mole percent. Feed gas mixture 1 also contains oxygen in a concentration generally within the range of from less than 1 to about 18 mole percent. Feed gas mixture 1 may also contain one or more other components such as trace hydrocarbons, nitrogen, carbon monoxide, water vapor, sulfur oxides, nitrogen oxides and particulates.

Compressed feed gas mixture 3 is passed from blower 2 into the lower portion of absorption column 4 which is operating at a temperature generally within the range of from 40 to 45° C. at the top of the column and at a temperature generally within the range of from 50 to 60° C. at the bottom of the column. Absorbent 6 is passed into the upper portion of absorption column 4. Absorbent 6 comprises at least one alkanolamine species. Examples of alkanolamines which may be employed in absorbent 6 in the practice of this invention are monoethanolamine, diethanolamine, diisopropanolamine, methyldiethanolamine and triethanolamine. Generally the alkanolamines are employed as an aqueous solution. The concentration of the alkanolamine(s) in absorbent 6 will be within the range of from 5 to 80 weight percent, and preferably from 10 to 50 weight percent. A preferred primary alkanolamine for use in the absorbent fluid in the practice of this invention is monoethanolamine, preferably in a concentration within the range of from 5 to 25 weight percent, more preferably in a concentration within the range of from 10 to 15 weight percent. Preferred secondary alkanolamines for use in the absorbent fluid in the practice of this invention are diethanolamine and diisopropanolamine.

Within absorption column 4 the feed gas mixture rises in countercurrent flow against downflowing absorbent. Absorption column 4 contains column internals or mass transfer elements such as trays or random or structured packing. As the feed gas rises, most of the carbon dioxide within the feed gas, oxygen, and small amounts of other species such as nitrogen, are absorbed into the downflowing absorber liquid resulting in carbon dioxide depleted top vapor at the top of column 4, and into carbon dioxide loaded absorbent containing dissolved oxygen at the bottom of column 4. The top vapor is withdrawn from the upper portion of column 4 in stream 5 and the carbon dioxide loaded absorbent is withdrawn from the lower portion of column 4 in stream 7.

Dissolved oxygen eventually causes degradation of alkanolamines thereby leading to corrosion and other operating difficulties. In the carbon dioxide recovery plant of this invention the carbon dioxide loaded absorbent is passed to an oxygen separator. In the system illustrated in FIG. 1, the level of the dissolved oxygen in the carbon dioxide loaded absorbent is reduced by contacting the absorbent with oxygen scavenging gas in a mass transfer device such as an oxygen stripping column.

The carbon dioxide loaded absorbent containing dissolved oxygen in stream 7 is passed from the lower portion of absorption column 4 into the upper portion of additional stripping column 151. It is an important aspect of this invention that the fluid comprising stream 7 does not undergo any heating from its withdrawal from absorption column 4 to its passage into the oxygen separator such as oxygen stripping column 151. Oxygen scavenging gas is passed into the lower portion of stripping column 151 in stream 152. One source of oxygen scavenging gas is an oxygen free carbon dioxide stream. Examples of such a stream include carbon dioxide rich vapor stream 16, shown in FIG. 1 as stream 71, carbon dioxide from a storage tank, or carbon dioxide from a further downstream process. Other oxygen free gases such as nitrogen can also be used.

Within stripping column 151 the oxygen scavenging gas rises in countercurrent flow against downflowing carbon dioxide loaded absorbent. Stripping column 151 contains column internals or mass transfer elements such as trays or random or structured packing. As the oxygen scavenging gas rises, oxygen within the absorbent is stripped from the downflowing absorbent into the upflowing scavenging gas resulting in oxygen containing scavenging gas at the top of stripping column 151, and into oxygen depleted carbon dioxide loaded absorbent at the bottom of stripping column 151. The oxygen containing scavenging gas is withdrawn from the upper portion of column 151 in stream 150. Stream 150 will typically contain some carbon dioxide in addition to oxygen and other species. This stream can be vented to the atmosphere, used as is, or mixed with the final product carbon dioxide in stream 16, as shown in FIG. 1 as stream 72. The oxygen depleted carbon dioxide loaded absorbent, typically containing less than 2 ppm oxygen and preferably less than 0.5 ppm, is withdrawn from the lower portion of column 151 in stream 153, passed to liquid pump 8 and from there in stream 9 to and through heat exchanger 10 wherein it is heated by indirect heat exchange to a temperature generally within the range of from 90 to 120° C., preferably from 100 to 110° C.

The heated carbon dioxide loaded absorbent is passed from heat exchanger 10 in stream 11 into the upper portion of second or main stripping column 12 which is operating at a temperature typically within the range of from 100 to 110° C. at the top of the column and at a temperature typically within the range of from 119 to 125° C. at the bottom of the column. As the heated carbon dioxide loaded absorbent flows down through stripping column 12 over mass transfer elements which can be trays or random or structured packing, carbon dioxide within the absorbent is stripped from the absorbent into upflowing vapor, which is generally steam, to produce carbon dioxide rich top vapor and remaining absorbent. The carbon dioxide rich fluid is withdrawn from the upper portion of stripping column 12 in top vapor stream 13 and passed through reflux condenser 47 wherein it is partially condensed. Resulting two phase stream 14 is passed to reflux drum or phase separator 15 wherein it is separated into carbon dioxide rich gas and into condensate. The carbon dioxide rich gas is removed from phase separator 15 in stream 16 and recovered as carbon dioxide product fluid having a carbon dioxide concentration generally within the range of from 95 to 99.9 mole percent on a dry basis. By "recovered" as used herein it is meant recovered as ultimate product or separated for any reason such as disposal, further use, further processing or sequestration. The condensate, which comprises primarily water and alkanolamines, is withdrawn from phase separator 15 in stream 17, passed through liquid pump 18 and as stream 19 into the upper portion of stripping column 12.

Remaining alkanolamine-containing absorbent which also contains water is withdrawn from the lower portion of stripping column 12 in stream 20 and passed to reboiler 21 wherein it is heated by indirect heat exchange to a temperature typically within the range of from 119 to 125° C. In the embodiment of the invention illustrated in FIG. 1, reboiler 21 is driven by saturated steam 48 at a pressure of 28 pounds per square inch gauge (psig) or higher, which is withdrawn from reboiler 21 in stream 49. The heating of the alkanolamine-containing absorbent in reboiler 21 drives off some water which is passed as steam in stream 22 from reboiler 21 into the lower portion of stripping column 12 wherein it serves as the aforesaid upflowing vapor. The resulting alkanolamine-containing absorbent is withdrawn from reboiler 21 in liquid stream 23. A portion 24 of stream 23 is fed to reclaimer or purifier 25 where this liquid is vaporized. Addition of soda ash or caustic soda to the reclaimer facilitates precipitation of any degradation byproducts and heat stable amine salts. Stream 27 depicts the disposal of any degradation byproducts and heat stable amine salts. The vaporized amine solution 26 can be reintroduced into stripping column 12 as shown in FIG. 1. It can also be cooled and directly mixed with stream 6 entering the top of absorption column 4. Also, instead of the reclaimer 25 shown in FIG. 1, other purification methods such as ion-exchange or electrodialysis could be employed.

The remaining portion 148 of heated alkanolamine-containing absorbent 23 is passed to solvent pump 35 and from there in stream 29 to and through heat exchanger 10 wherein it serves to carry out the aforesaid heating of the carbon dioxide loaded absorbent and from which it emerges as cooled alkanolamine-containing absorbent 34.

Stream 34 is cooled by passage through cooler 37 to a temperature of about 40° C. to form cooled absorbent 38. A portion 40 of stream 38 is passed through mechanical filter 41, from there as stream 42 through carbon bed filter 43, and from there as stream 44 through mechanical filter 45 for the removal of impurities, solids, degradation byproducts and heat stable amine salts. Resulting purified stream 46 is recombined with stream 39 which is the remainder of stream 38 to form stream 55. Storage tank 30 contains additional alkanolamine for makeup. Alkanolamine absorbent is withdrawn from storage tank 30 in stream 31 and pumped by liquid pump 32 as stream 33 into stream 55. Storage tank 50 contains makeup water. Water is withdrawn from storage tank 50 in stream 51 and pumped by liquid pump 52 as stream 53 into stream 55. Streams 33 and 53 together with stream 55 form combined absorbent stream 6 for passage into the upper portion of absorber column 4 as was previously described.

Figure 2:
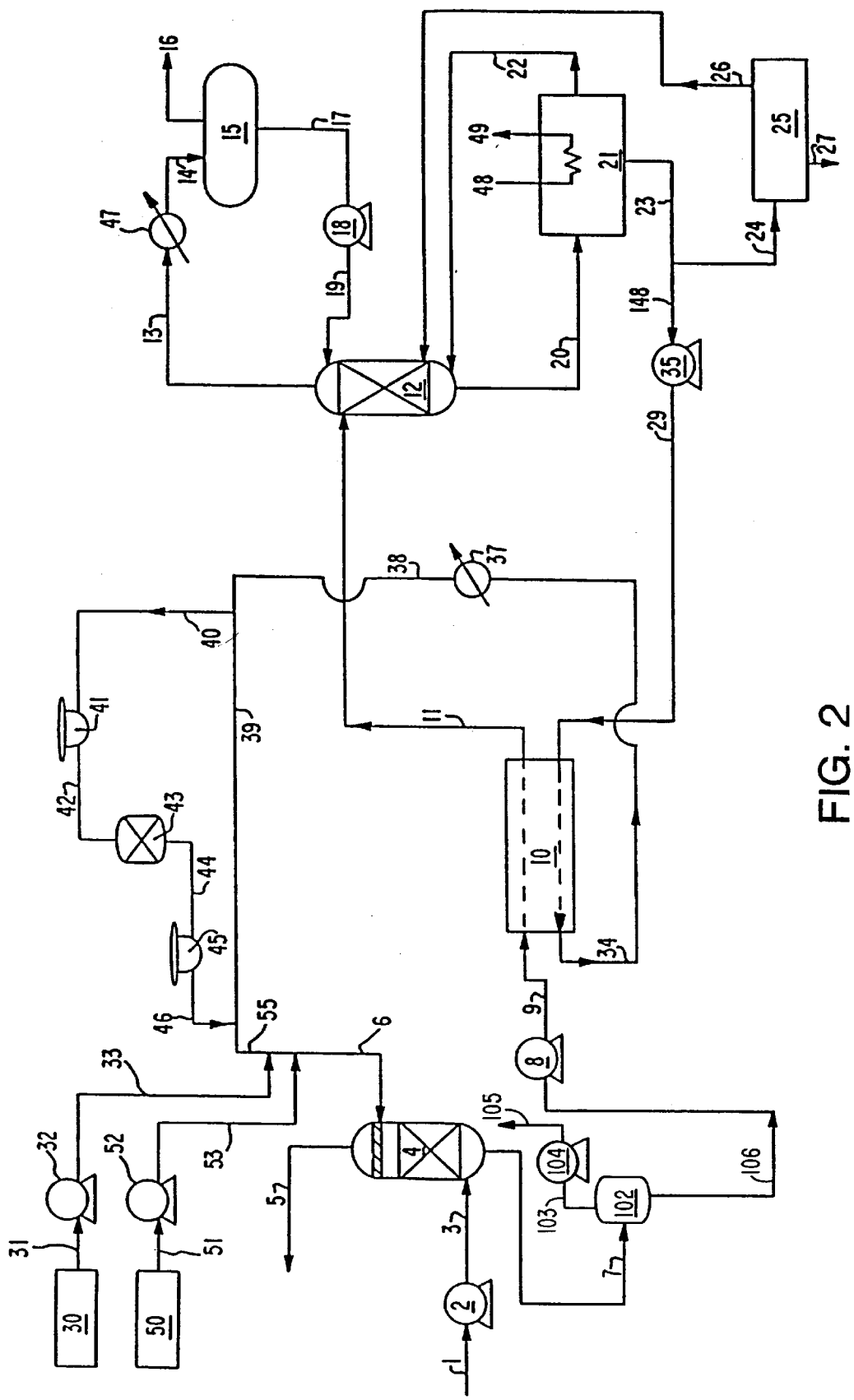
FIG. 2 is a schematic representation of another particularly preferred embodiment of the invention wherein the oxygen separator comprises a flash tank.

FIG. 2 illustrates another embodiment of the invention wherein a flash tank and vacuum pump are used to carry out the deoxygenation of the carbon dioxide loaded absorbent. The numerals of FIG. 2 are the same as those for FIG. 1 for the common elements and these common elements will not be discussed again in detail.

Referring now to FIG. 2, carbon dioxide loaded absorbent 7 is passed to flash tank 102 where its pressure is reduced from about atmospheric pressure to subatmospheric pressure, generally within the range of 1 to 10 psia and preferably within the range of from 2 to 6 psia, by operation of vacuum pump 104. As a consequence of this depressurization, dissolved oxygen is released form the absorbent. Generally the depressurization will cause at least 50 percent of the oxygen dissolved in absorbent 7 to be released. The released oxygen is passed out of flash tank 102 in stream 103, through vacuum pump 104, and removed from the system in stream 105. Depressurization will cause some carbon dioxide to be released along with oxygen and other species. The stream can be vented to the atmosphere, used as is, or mixed with the final product carbon dioxide. The resulting oxygen depleted carbon dioxide loaded absorbent, typically containing less than 2 ppm oxygen and preferably less than 0.5 ppm oxygen, is withdrawn from flash tank 102 in stream 106, passed to liquid pump 8 and from there in stream 9 to and through heat exchanger 10 for further processing as previously described in conjunction with the embodiment illustrated in FIG. 1.

The invention differs from conventional systems which either provide inhibitors to protect the alkanolamines from the oxygen, or remove the oxygen prior to contact with the alkanolamines. Applicants have found that the seemingly inefficient arrangement of mixing oxygen with the alkanolamines and then removing the oxygen enables unexpected overall system benefits.

Although the invention has been described in detail with reference to certain particularly preferred embodiments, those skilled in the art will recognize that there are other embodiments of the invention within the spirit and the scope of the claims. For example the invention may be used for separating other compounds other than or in addition to carbon dioxide, such as hydrogen sulfide.

What is claimed is:

1. Apparatus for recovering absorbate from an oxygen-containing feed mixture comprising:
   (A) an absorption column, means for passing a feed mixture comprising oxygen and absorbate into the lower portion of the absorption column, and means for passing absorbent comprising at least one alkanolamine into the upper portion of the absorption column;
   (B) an oxygen separator and means for passing fluid from the lower portion of the absorption column into the oxygen separator;
   (C) a heat exchanger and means for passing fluid from the oxygen separator to the heat exchanger;
   (D) a stripping column and means for passing fluid from the heat exchanger to the upper portion of the stripping column; and
   (E) means for recovering absorbate from the upper portion of the stripping column.

2. The apparatus of claim 1 wherein the oxygen separator comprises an oxygen stripping column.

3. The apparatus of claim 1 wherein the oxygen separator comprises a flash tank.

4. The apparatus of claim 1 further comprising a reboiler, means for passing fluid from the lower portion of the stripping column to the reboiler, and means for passing fluid from the reboiler to the heat exchanger.

5. The apparatus of claim 4 further comprising means for passing fluid from the reboiler to the lower portion of the stripping column.

6. The apparatus of claim 4 further comprising a purifier, means for passing fluid from the reboiler to the purifier, and means for passing fluid from the purifier to the lower portion of the stripping column.

7. The apparatus of claim 1 wherein the means for recovering absorbate from the upper portion of the stripping column comprises a condenser and a phase separator.

8. The apparatus of claim 7 further comprising means for passing fluid from the phase separator to the upper portion of the stripping column.

9. The apparatus of claim 1 further comprising means for recovering absorbate from the oxygen separator.

* * * * *